Oct. 20, 1970
R. T. CORNELIUS
3,535,124
PROCESS FOR PRESERVING A FRESH FRUIT JUICE IN A DISPENSER
Original Filed March 5, 1965
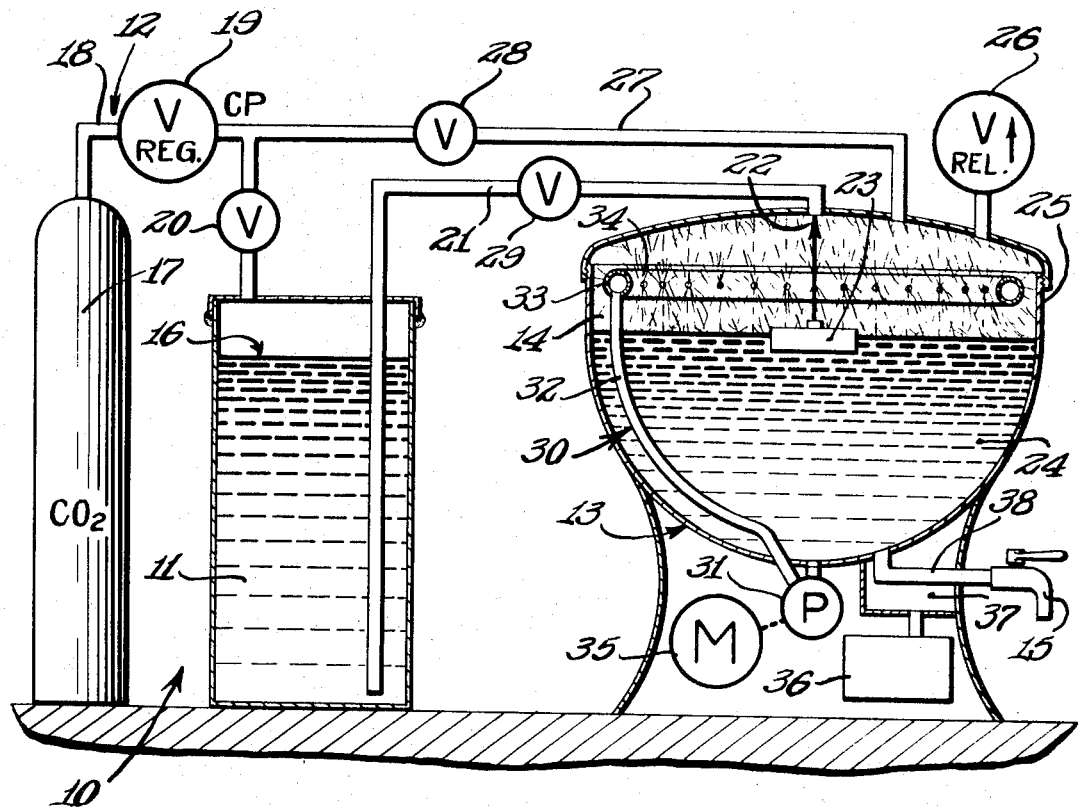
INVENTOR.
Richard T. Cornelius
ATTORNEYS

United States Patent Office 3,535,124
Patented Oct. 20, 1970

3,535,124
PROCESS FOR PRESERVING A FRESH FRUIT JUICE IN A DISPENSER

Richard T. Cornelius, Minneapolis, Minn., assignor to The Cornelius Company, Anoka, Minn., a corporation of Minnesota
Application Mar. 5, 1965, Ser. No. 446,450, now Patent No. 3,478,929, dated Nov. 18, 1969, which is a continuation-in-part of application Ser. No. 352,051, Mar. 16, 1964. Divided and this application June 17, 1969, Ser. No. 834,079
Int. Cl. A23l 3/00
U.S. Cl. 99—155      6 Claims

ABSTRACT OF THE DISCLOSURE

A method for preserving fresh fruit juice in a dispenser includes continually recirculating a previously-carbonated quantity of the juice so as to decarbonate the same within the dispenser, the quantity of juice being decarbonated, prior to being dispensed, being subject to an atmosphere of carbon dioxide or nitrogen obtained independently of the carbonated juice, such atmosphere effecting transfer of the stored fruit juice to the decarbonating chamber automatically.

---

This application is a division of my application Ser. No. 446,450 filed Mar. 5, 1965, now U.S. Pat. No. 3,478,929 which is a continuation-in-part of my application Ser. No. 352,051, filed Mar. 16, 1964, now abandoned.

This invention relates to a method for preserving fresh fruit juice against deterioration in a dispenser, in which a decarbonated or non-carbonated fruit juice is dispensed from a source of previously carbonated fruit juice.

It has been the practice heretofore to provide a dispenser having a transparent juice storage chamber within which the juice is agitated in a suitable manner to prevent the settling of pulp, by which the juice has been subjected to aeration, which aeraiton has accelerated the deterioration or spoilage of the beverage in the dispenser.

According to the present invention, a method is provided by which an inert gas such as carbon dioxide gas or nitrogen gas is employed in an effective manner to minimize or eliminate such deterioration, the beverage being dispensed in a substantially decarbonated or non-carbonated condition. Previously carbonated fruit juice is transferred from a supply of such fruit juice to a decarbonating chamber in a dispenser. In such chamber, the carbonated fruit juice is continually recirculated to cause the portion transferred thereto to give off substantially all its carbon dioxide gas while in the dispenser to prepare it for immenent consumption to effect decarbonation. Preferably the juice is sprayed through an inert atmosphere having a partial pressure of carbon dioxide gas which is less than that of the carbon dioxide gas in solution.

Accordingly, it is an object of the present invention to provide a method for preserving fresh fruit juice against deterioration in a dispenser.

A further object of the present invention is to provide a method for dispensing a decarbonated fruit juice from a source of carbonoted fruit juice.

Yet another object of the present invention is to provide a method by which an inert gas such as carbon dioxide gas or nitrogen gas is used to purge air from a dispenser to prevent beverage therein from being exposed to air subsequent deterioration.

Many other advantages, features and additional objects of the present invention will become manifest to those versed in the art upon making reference to the detailed description and the accompanying drawing sheet in which a preferred structural embodiment incorporating the principles of the present invention is shown by way of illustrative example.

On the drawing:

The drawing is a diagrammatic view of a system for preserving a fruit juice beverage within a dispensing system, provided in accordance with the principles of the present invention.

As shown on the drawing:

The principles of the present invention are particularly useful when embodied in a fruit juice dispensing system such as illustrated in the drawing, generally indicated by the numeral 10. The dispensing system 10 includes a storing means 11 for the fruit juice, pressurizing means generally indicated at 12 for applying pressurized inert gas such as carbon dioxide gas or nitrogen gas to such fruit juice, a dispenser generally indicated at 13 and having a chamber 14 in which the juice is agitated, and a dispensing valve 15 communicating with the chamber 14.

The storing means 11 comprises a tank in which there is disposed a supply of fruit juice 16 in which there has been previously dissolved a substantial quantity of carbon dioxide gas. The juice in such bulk storage therefore constitutes previously carbonated fruit juice.

The pressurizing means 12 includes a gas cylinder 17 in which there is a quantity of highly pressurized inert gas such as carbon dioxide gas or nitrogen gas. The cylinder 17 communicates by means of a line 18 with a pressure regulator valve 19 which is set to provide a pressure suitable for propelling carbonated fruit juice 16, and for maintaining the carbonation of the supply of carbonated fruit juice 16 where the inert gas in carbon dioxide. Preferably, a manually operable valve 20 is provided between the regulator valve 19 and the tank 11 for facilitating replacement of the tank 11 with a similar full tank. The gas pressure in the storing means or tank 11 is substantially constant, for example, between 40 and 60 p.s.i., and thus the gas serves both to preserve and to propel or expel the fruit juice 16.

The dispenser chamber 14 receives a portion of the supply 16 of carbonated fruit juice through a line 21 which extends to the lower portion of the tank 11 and which opens into or discharges into the upper portion of the chamber 14. Suitable means are provided to regulate the admission of additional carbonated fruit juice to the chamber 14. In the drawing, there is schematically shown a normally closed valve 22, the position of which is under the control of a float 23, the height of which is controlled by the level of fruit juice 24 disposed in the chamber 14. Thus, the normally closed means 22 controls the flow of fruit juice automatically from the supply 16 to the chamber 14 through the fluid connection 21, in accordance with demand.

The normally closed means 22 is operative to reduce the pressure on the juice flowing through the line 21 as it flows past such means 22. Preferably, the means 22 is so constructed as to create a high degree of agitation or turbulence in the juice as it enters the chamber 14, thereby agitating or spraying it into the chamber 14. The reduction in pressure on that portion of the supply of fruit juice which is transferred, which reduction in pressure is effected by the means 22, aids in rendering carbonated juice unstable in that it serves to cause dissolved carbon dioxide gas to be released or to leave or to be given off from such transferred portion. Thus, the decarbonation begins with the reduction of pressure and with the ensuing agitation or spray which further serves to cause the release of carbon dioxide gas from such portion. This transfer of juice into the chamber 14 continues until the chamber 14 is partially filled so as to cause the means 22, 23 to close the fluid connection line 21 automatically.

The chamber 14 is defined by means 25 so constructed as to be pressurizable, there being a relief valve 26 communicating with the chamber 14, the relief valve 26 being set to open or crack at a pressure within the chamber 14 which is above atmospheric pressure. The relief valve 26 thus retains inert gas including any released carbon dioxide gas in the space or portion of the chamber 14 lying above the juice 24 therein. This retained gas is thus maintained therein at a pressure above atmospheric, and any excess in such gas is vented to the atmosphere by the relief valve 26. Since the relief valve 26 is disposed so as to vent the upper portion of the chamber 14, there is separation within the chamber of any released gas, which rises, and the liquid, which settles.

The structure further includes a pressurizing and purging line 27 having a manually operated control or purging valve 28 communicating with the downstream side of a pressure regulator valve 40 upstream of the valve 20 and with the chamber defining means 25 for selectively admitting gas from the cylinder 17 into the chamber 14. The valve 40 is connected to the downstream side of the regulator valve 19. The air within the chamber 14 may be initially purged out of such chamber by such inert purging gas which is thus vented to the atmosphere by the relief valve 26, a portion of such purging gas being retained therein so that the entire internal atmosphere is an inert gas. Alternatively, carbonated fruit juice may be first transferred into the chamber 14 by opening of a normally open manually controllable valve 29. Although some purging will thus take place automatically, the valve 28 may thereafter be opened to ensure a reasonably pure atmosphere of carbon dioxide gas, nitrogen gas, or a mixture thereof in the space above the fruit juice.

The system 10 further includes means for substantially totally decarbonating the carbonated fruit juice for imminent consumption. In this embodiment, such decarbonating means comprises further means for physically agitating the portion 24 of fruit juice which has been admitted into the chamber 14. Such agitation is provided by circulating means generally indicated at 30 which includes a pump 31 which continually withdraws juice from the chamber 14 and propels it through a line 32 to a suitable spray member 33 which is suitably apertured or nozzled to discharge the juice as a spray 34. Such handling or circulation thus further acts to decarbonate the fruit juice in the chamber 14 in a continual manner. Since there is virtually no oxygen present in the upper portion of the chamber, such "aeration" in an oxygen-free or inert atmosphere precludes deterioration due to conventional aeration, and the aerating circulating means that has been a prime factor in causing previous deterioration is thus employed in a preferred form of this invention to obtain an opposite or new result, namely to release a protective quantity of carbon dioxide gas into the chamber to preclude such deterioration, while retaining the visual enhancement of the beverage in the dispenser 13.

The pump 31 is driven by a motor 35 disposed in the base of the dispenser 13.

If desired, a temperature control system 36 may be employed with a heat exchange jacket 37 associated with a line 38 leading to the dispensing valve 15, for lowering or raising the temperature of the juice 24 in the dispenser 13.

Thus the apparatus described embodies a preferred form of the process of this invention which includes the use of carbon dioxide gas in the tank 17 in a highly carbonated beverage 16 in the tank 11 which is dispensed at the valve 15 as a decarbonated beverage. In such operation, the regulator valve 40 may be omitted and the valve 28 left normally closed, as sufficient inert gas will be released during decarbonation in the chamber 14. The relief valve 26 could then be set slightly above atmospheric pressure.

If the beverage 16 is lightly carbonated, the regulator valve 40 and valve 28 should be set so as to supplement the gas released by decarbonation, and to prevent a waste of the supplemental gas, the relief valve 25 should be set to crack at a pressure above the setting of the regulator valve 40 which typically may be as low as 5 p.s.i. under this condition so as to ecect proper dispensing of the beverage.

With either a highly or lightly carbonated beverage supply 16, the inert gas supply 17 may thus comprise nitrogen, which would mix in the chamber 14 with carbon dioxide gas released by decarbonation. The regulator valve 40 would typically have a similar setting.

By use of carbon dioxide gas, preservation is kept at a maximum, while by use of nitrogen gas, foaming is kept at a minimum, but more importantly, the possibility that beverage will absorb $CO_2$ from above is eliminated, and hence overcarbonation during extended storage is eliminated.

Although various minor modifications might be suggested by those versed in the art, it should be understood that I wish to embody within the scope of the patent warranted herein, all such embodiments as reasonably and properly come within the scope of the appended claims.

I claim as my invention:

1. A process for preserving a fresh fruit juice against deterioration in a dispenser, comprising:
   (a) admitting a quantity of such fresh juice into the dispenser, in which juice a substantial amount of carbon dioxide gas has been previously dissolved; and
   (b) continually recirculating such juice by withdrawing juice from the lower portion of the dispenser and discharging the juice into the space above the quantity of juice within the dispenser at a pressure below the initial partial pressure of the carbon dioxide gas which is being admitted, but no less than atmospheric pressure, to cause said quantity to give off substantially all its dissolved carbon dioxide gas while in said dispenser to prepare it for imminent consumption.

2. A process for preserving a fresh fruit juice against deterioration in a dispenser according to claim 1, in which said quantity only partially fills a dispenser chamber, and in which the juice is recirculated substantially as a spray through the space above said quantity.

3. A process for preserving a fresh fruit juice against deterioration in a dispenser according to claim 1, in which said quantity only partially fills a dispenser chamber, including purging the dispensing chamber above the juice with carbon dioxide gas obtained independently of the carbonated juice, and retaining a quantity of such purging gas above the juice at a pressure slightly over atmospheric, with which purging gas the given-off gas subsequently mixes.

4. A process for preserving a fresh fruit juice against deterioration in a dispenser according to claim 3 including venting the gas in said chamber to the atmosphere in such manner as to maintain said pressure slightly over atmospheric in the chamber.

5. A process for preserving fresh fruit juice against deterioration in a dispenser according to claim 1, including
   (a) applying pressurized nitrogen gas to the surface of a supply of the fruit juice from which supply said quantity of fruit juice is withdrawn before being admitted into the dispenser, such withdrawing being in response to the pressure of the nitrogen gas; and
   (b) providing on the surface of said quantity of fruit juice an atmosphere of nitrogen gas supplied thereto independently of the nitrogen gas on the supply, said atmosphere of nitrogen gas mixing with said carbon dioxide gas which is given off.

6. A process for preserving a fresh fruit juice against deterioration in a dispenser according to claim 1, including partially venting the previously-dissolved given-off gas to the atmosphere so as to maintain said dispenser pressure.

References Cited

UNITED STATES PATENTS

| | | | |
|---|---|---|---|
| 2,361,640 | 10/1944 | McKinnis | 99—155 X |
| 2,499,243 | 2/1950 | Franklin | 99—155 |
| 2,500,670 | 3/1950 | Dunkley | 99—155 |
| 2,507,797 | 5/1950 | McK Martin | 90—155 |
| 3,044,887 | 7/1962 | Smith et al. | 99—205 |
| 3,113,871 | 12/1963 | Webster | 99—205 X |
| 3,113,876 | 1/1961 | Smith et al. | 99—155 X |
| 2,911,308 | 11/1959 | Smith | 99—186 |

OTHER REFERENCES

Morgan et al., "Effect of $CO_2$, etc." (Florida State Hort. Soc. (1954), vol. LXVII, pages 166–170).

NORMAN YUDKOFF, Primary Examiner

F. E. DRUMMOND, Assistant Examiner

U.S. Cl. X.R.

99—78, 79, 189; 222—318